United States Patent [19]

Nagayama et al.

[11] Patent Number: 5,680,187
[45] Date of Patent: Oct. 21, 1997

[54] LIQUID CRYSTAL DISPLAY DEVICE AND METHOD FOR MANUFACTURING THE SAME

[75] Inventors: Kazuyoshi Nagayama, Yamato; Toshihiro Ueki, Kawasaki, both of Japan

[73] Assignee: International Business Machines Corporation, Armonk, N.Y.

[21] Appl. No.: 416,280

[22] Filed: Apr. 4, 1995

[30] Foreign Application Priority Data

Apr. 4, 1994 [JP] Japan .................. 6-066284

[51] Int. Cl.$^6$ ................ G02F 1/13; G02F 1/1337; C09K 19/52; C09K 19/54
[52] U.S. Cl. .............. 349/110; 349/156; 252/299.01; 252/299.4
[58] Field of Search ............. 252/299.01, 299.4; 359/68, 74, 55; 349/33, 106, 108, 123, 126, 110, 156

[56] References Cited

U.S. PATENT DOCUMENTS

| | | | |
|---|---|---|---|
| 5,150,232 | 9/1992 | Gunkima et al. | 359/51 |
| 5,446,562 | 8/1995 | Sato | 359/59 |
| 5,493,429 | 2/1996 | Kanemoto et al. | 359/68 |
| 5,500,750 | 3/1996 | Kanbe et al. | 359/58 |

FOREIGN PATENT DOCUMENTS

| | | |
|---|---|---|
| 0159823 | 8/1985 | Japan . |
| 0101823 | 5/1988 | Japan . |
| 03287234 | 12/1991 | Japan . |

OTHER PUBLICATIONS

Patent Abstracts of Japan –vol. 015, No. 214 (P-1209), 31 May 1991; & JP 03 059522 A (Hitachi Ltd.) 14 Mar. 1991.
Patent Abstracts of Japan –vol. 017, No. 553 (P-1625), 5 Oct. 1993 & JP 05 158067 A (Stanley Electric Co. Ltd) 25 Jun. 1993.
Patent Abstracts of Japan –vol. 010, No. 154 (P-463) 4 Jun. 1986 & JP 61 007823 A (Canon KK) 14 Jan. 1986.
Patent Abstracts of Japan –vol. 010, No. 007 (P-419) 11 Jan. 1986 & JP 60 164723 A (Seiko Denshi Kogyo KK) 27 Aug. 1985.
Patent Abstracts of Japan –vol. 017, No. 621 (P-1645) 16 Nov. 1993 & JP 05 196946 A (Sharp Corp.) 6 Aug. 1993.

*Primary Examiner*—Richard D. Lovering
*Attorney, Agent, or Firm*—David Aker; Jay P. Sbrollini

[57] ABSTRACT

To obtain a liquid crystal display device which has no leakage of light and has excellent contrast in the minimum number of manufacturing processes. To obtain cell gap Ga on the array panel 12, first projecting sections 38A are formed in a black matrix 38, and, on the color filter panel 13, second projecting sections 50 are formed in which a red color filter 46R, a green color filter 46G, and a blue color filter 46B are placed one upon another. Since the heights of the first projecting sections 38A and the second projecting sections 50 can be made, for instance, half of cell gap Ga, the rubbing process of orientation films 40 and 54 can be performed reliably. In this way, liquid crystal elements can be fully aligned, preventing the leakage of light. Further, since no transparent spacer is required, there is no leakage of light due to this. In addition, the projecting sections can be formed simply by the processes for forming the color filter 46 and the black matrix 38.

12 Claims, 6 Drawing Sheets

| | |
|---|---|
| BYV | (2.20) |
| R | (0.66) |
| G | (0.25) |
| B | (0.82) |
| R+G+B | (2.22) |
| R+G+B+BYV | (4.44) |

LIQUID CRYSTAL DISPLAY DEVICE AND METHOD FOR MANUFACTURING THE SAME

FIELD OF THE INVENTION

The present invention is related to a liquid crystal display device for displaying a color image, and particularly to a liquid crystal display device of the black-matrix-on-array type in which a black matrix (BM) is formed on the array panel, and a method for manufacturing such device.

BACKGROUND OF THE INVENTION

The conventional liquid crystal display devices include a variety of types such as an active matrix liquid crystal display device using a thin film transistor (TFT) and the like as a switching element, and a simple matrix liquid crystal display device of STN and the like. Although these liquid crystal display devices are different in the method for driving liquid crystal, they have in common the fact that liquid crystal is sealed between glass panels disposed opposite to each other, signal lines are disposed in a matrix arrangement on the glass panels, and the liquid crystal in the vicinity of the intersecting signal lines is driven to construct a display pixel.

Among these liquid crystal display devices, the development of a liquid crystal display device (TFT/LCD) for a color display using TFTs as switching elements has recently become widely used. In such a TFT/LCD, display electrodes are formed in a matrix arrangement, and it has an array panel and an opposite panel (color filter panel) which is disposed opposite to the array panel surface with a predetermined distance between them.

In the vicinity of the display electrodes of the array panel, TFTs are arranged as switching elements, and the sources of these TFTs are connected to the display electrodes formed in pixel opening sections. Also, the gates and drains of the TFTs are connected to the row and column signal lines of the matrix.

On the opposite panel of a TFT/LCD, color filters of the three primary colors of red (R), green (G), and blue (B) are arranged in a matrix arrangement so as to correspond to the display electrodes of the array panel. Between each color filter, a black matrix (for example, made of a synthetic resin containing a black pigment formed by a photolithography method) is arranged for blocking areas between each color filter from light. In addition, on the color filters on the opposite panel, common display electrodes indium-tin-oxide (ITO) and the like are formed.

On both upper panels disposed opposite to each other, a layer for orienting liquid crystal molecules, for instance, an orientation film rubbed in a predetermined direction to twist the arrangement of liquid crystal molecules by 90 degrees is formed. The peripheries of both panels are sealed by a sealing material, liquid crystal being sealed between both panels.

In conventional liquid crystal display device, for instance, a large number of transparent spherical spacers is dispersed between both panels to obtain a predetermined cell gap (cell thickness).

In a liquid crystal display device, it is important to make cell gap d between the opposed panels constant. If cell gap d varies at each position on the panel surface, optical-path difference Δn·d of the liquid crystal layer at each position (the product of the index of birefringence of the crystal liquid layer Δn and the thickness of the liquid crystal layer, or cell gap d) would vary. Since the variation of optical-path difference Δn·d of the liquid crystal layer causes the optical response speed and transmissivity of the liquid crystal, if cell gap d is not uniform at each position on the panel surface, the contrast ratio and chromaticity of the display screen will vary, which leads to a degradation in the display quality in that the uniformity of screen cannot be maintained.

Accordingly, conventionally, transparent spherical spacers of glass or synthetic resin were dispersed between both panels to form a predetermined cell gap.

However, it was difficult to form spacers having a uniform grain diameter, and, in addition, it was also difficult to uniformly disperse the spacers between the panels.

Conventionally, the spacers were dispersed by a wet dispersion method (a method wherein a volatile liquid medium in which the spacers are dispersed is sprayed to the panels in a furnace, and the medium is vaporized during the process to allow only the spacers to be deposited on the panels). In this dispersion method, however, the use of Freon, a type of flon (CFC), could not be avoided since the medium must be quickly volatilized. However, in view of environmental considerations, it became no longer appropriate to use such a wet dispersion method.

Thus, to disperse spacers using a dry dispersion method (a method for dispersion by electrostatic force) was examined, but it was more difficult to uniformly disperse the spacers than when using the wet dispersion method, and there is the problem that the panels could become dotted with a plurality of solidified spacers.

In addition, regarding the display quality of a liquid crystal display device, consideration must also be paid to the transparent spherical spacers themselves to be used for obtaining a constant cell gap.

That is, there is the problem that since the spacers are transparent spherical bodies, light will leak through the spacers when a black color is displayed if the spacers are in a pixel, and the arrangement of liquid crystal molecules in the vicinity of spacers would be disturbed by the existence of the spacers between the panels in which the liquid crystal is sealed, and leakage of light could occur in the section where the arrangement was disturbed, the black level is reduced by the leakage of light, and hence the contrast would decrease.

Thus, for instance, in the Patent Application Laid-open No. 60-164723 official gazette, a liquid crystal display device in which the dispersion of spherical spacers is eliminated is accomplished by forming a support of polyimide having a height corresponding to a predetermined cell gap on the element for driving liquid crystal.

The reason why polyimide is used as the spacer material in the above disclosure is that the thickness of the spacers must be on the order of 5 to 10 μm, and the thickness uniformity in the formation process and the etching method are accompanied by considerable difficulties if this thickness is achieved by a silicon oxide film or a silicon nitride film.

However, in accordance with the method of the above-mentioned official gazette, the process for dispersing spherical spacers is eliminated, but there is a problem that a process for forming a polyimide support on the liquid crystal driving element (a process for applying photosensitive polyimide), a process for selectively leaving the polyimide (a photolithography process), and a process for thermally setting the polyimide which was selectively left should be further added, and these cause a reduction in the manufacturing yield. Further, a pattern for the photolithograph process is also required.

In addition, there is another problem in that failures are likely to occur in the application of the orientation film and these cause the orientation of liquid crystal molecules to fail. That is, in a liquid crystal display device, providing an orientation film for aligning liquid crystal molecules in a predetermined direction on a plane in contact with the liquid crystal is essential. Polyimide is generally used for the orientation film, and polyimide is formed on a panel to a predetermined thickness (several hundred angstroms), and thereafter a rubbing process (the process of rubbing the surface in a predetermined direction) is performed. In this liquid crystal display device, the color filter panel is flat whereas on the array panel, a polyimide support of a height corresponding to the cell gap is formed. However, if there is a projecting section (support) having a height of 5 μm or greater on the array panel, the component for the rubbing process is prevented by the high projection section (support) from contacting the section (around the projecting section) in the shadow of the projecting section, and thus there is a problem in that liquid crystal molecules cannot be aligned in a predetermined direction in the section where the rubbing process could not be performed.

Consequently, on the one hand, in the above identified disclosure, the disadvantage of the conventional method in which spherical spacers are dispersed is solved to a certain extent, but there are other problems remaining, that is, the reduction of the manufacturing yield due to the increase in the steps in the manufacturing processes, and the problems due to the polyimide itself and the structure of the support made of polyimide.

On the other hand, a liquid crystal display device is proposed in which filters of three colors, R, G, and B, are placed one upon another on a color filter panel to form a spacer (Patent Application Laid-open No. 5-196946 official gazette). In this liquid crystal display device, there is provided a three-layer structure constructed by superimposing each color in the order of R, G, and B between the color filters from the panel of the color filter to the position of the black matrix section, and the black matrix section provided on the color filter and the three-layer structure are used as a spacer, thereby eliminating the need for spherical spacers.

In this liquid display device, however, there is an advantage that the complex process of forming a polyimide support described in the previous sections is not required, but since there is a three-layer high structure corresponding to the cell gap on the color filter panel, there is a problem in that the section (around the three-layer structure) in the shadow of the three-layer structure is not rubbed in the rubbing process, and liquid crystal molecules cannot be aligned in a predetermined direction in the section which did not undergo the rubbing process.

In addition, there is proposed a liquid crystal display device wherein a block component defining a cell gap is provided in a section on which a semiconductor as an array panel is provided, thereby to form a spacer (Patent Application Laid-open No. 56-2577 official gazette), but the spacer is too high as in the liquid crystal display device of the above described Patent Application Laid-open No. 60-164723 official gazette, and thus the section around the spacer is not rubbed either, so there is a problem in that liquid crystal molecules cannot align in a predetermined direction.

In any of the above described examples of the prior art, then, a support or the like corresponding to a cell gap is formed on either an array panel or a color filter panel, and there is a problem in that the section near the support and the like do not undergo the rubbing process, which causes the liquid crystal in that section to fail to produce orientation.

SUMMARY OF THE INVENTION

It is the object of the present invention to provide a liquid crystal display device which requires a minimum number of manufacturing processes, has no leakage of light, and has excellent display characteristics, and a method for manufacturing the liquid crystal display device.

The liquid crystal display device of the present invention is characterized by an array panel having pixel opening sections disposed in a matrix arrangement, active elements formed in the vicinity of the pixel opening sections, and a plurality of first projecting sections which are formed so as to be higher than other sections by a black matrix which is formed so as to block regions other than the pixel opening sections from light; an orientation film formed on the side of the array panel on which the black matrix is formed; a color filter panel disposed opposite to the array panel, on which color filters are formed so as to correspond to the pixel opening sections and a plurality of second projecting sections are formed so as to be higher than other sections, the second projecting sections being opposed to the first projecting sections for defining cell gaps together with the first projecting sections; an orientation film formed on the side of the color filter panel on which the color filters are formed; and liquid crystal interposed between the array panel and the color filter panel.

The liquid crystal display device of the present invention may include second projecting sections formed out of materials forming the color filters.

The liquid crystal display device of the present invention may include second projecting sections having a multilayer structure of any two colors of the color filter forming materials of three colors, that is, red, green, and blue.

The liquid crystal display device of the present invention may include second projecting sections having a multilayer structure of the color filter forming materials of three colors, that is, red, green, and blue.

The liquid crystal display device of the present invention may include first projecting sections formed on the active elements.

The liquid crystal display device of the present invention may include first and second projecting sections opposed to one another through both orientation films.

The liquid crystal display device of the present invention may be characterized in that the height from the surface of the color filters formed so as to correspond to the pixel opening sections in the color filter panel to the top of the second projecting sections is limited to 3.8 μm or less.

The liquid crystal display device of the present invention may be characterized in that the height from the surface of the pixel opening sections in the array panel to the top of the first projecting sections is limited to 3.8 μm or less.

The liquid crystal display device of the present invention may be characterized in that a display electrode is provided between the top of the second projecting sections and the orientation film.

The method invented for manufacturing a liquid crystal display device according to the present invention includes the steps of determining the height of the first projecting sections to be formed on an array panel and the height of the second projecting sections to be formed on a color filter panel so that the sum of the heights of the first and second projecting sections corresponds to a cell gap; on an array panel having pixel opening sections disposed in a matrix arrangement and active elements disposed in the vicinity of the pixel opening sections, forming a plurality of first projecting sections by a black matrix for blocking regions other than the pixel opening sections from light so that the first projecting sections are as high as determined; on a color filter panel, forming color filters in positions corresponding to the pixel opening sections, and forming a plurality of second projecting sections so that they are as high as determined; forming an orientation film of the array panel on which the first projecting sections are formed and on the color filter panel on which the second projecting sections are formed, respectively; placing the array panel and the color filter panel, on which the orientation films are formed, one upon the other, so that the first and second projecting sections are opposed to each other, and sealing the peripheries thereof; and injecting liquid crystal between the array panel and the color filter panel after sealing the peripheries thereof.

Finally, the method for manufacturing a liquid crystal display device according to the present invention may be characterized in that the second projecting sections are formed out of the color filter forming materials simultaneously with the color filters.

In accordance with the liquid crystal display device of the present invention, by causing the array panel and the color filter panel to be opposed to each other, a cell gap can be defined by the first and second projecting sections. Since the cell gap is the sum of the first and second projecting sections, for instance, the heights of the first and second projecting sections can be made to be half the cell gap, respectively, and thus the highest sections of the array panel and the color filter panel can be made low, by which the rubbing processes of the orientation film on the array panel and of the orientation film on the color filter panel can reliably be performed over the whole surface. By this, the liquid crystal molecules corresponding to the pixel opening sections can be aligned in a predetermined direction.

In the liquid crystal display device of the present invention, since the second projecting sections are formed out of the color filter forming materials, the formation of the second projecting sections can be performed simultaneously with that of the color filters. In addition, since the second projecting sections are formed using the color filter forming materials, there is no need for using other forming materials and hence the number of manufacturing processes for the color filter panel does not increase.

In the liquid crystal display device of the present invention, since the second projecting sections have a multilayer structure of any two colors of the color filter forming materials of three colors, red, green, and blue, the second projecting sections can be formed by any two of the color filter forming processes of three colors, that is, red, green, and blue. Thus, the second projecting sections can be formed so that they are higher than the color filter sections corresponding to the pixel opening sections by one color.

In the liquid crystal display device of the present invention, since the second projecting sections have a multilayer structure of the color filter forming materials of three colors, red, green, and blue, the second projecting sections can be formed by the color filter forming processes of three colors, red, green, and blue. Thus, the second projecting sections can be formed so that they are higher than the color filter sections of the pixel opening sections by two colors.

In the liquid crystal display device of the present invention, since the first projecting sections formed by a black matrix are formed on the active elements, the blocking of the active elements is ensured and hence the malfunction of the active elements due to external light can be prevented. Particularly, the best blocking characteristic can be obtained when the second projecting sections have a multilayer structure of the color filter forming materials of three colors, red, green, and blue. In addition, by forming a black matrix of a fixed thickness on the array panel, the first projecting sections can be formed on the projecting active elements.

In the liquid crystal display device of the present invention, since orientation films are formed between the first and second projecting sections, the cell gap can be compensated for by the thickness of the orientation films. In addition, since the thickness of the orientation films is thin compared to the black matrix, the cell gap can be finely adjusted.

In the liquid crystal display device of the present invention, since the height from the surface of the color filters formed so as to correspond to the pixel opening sections to the top of the second projecting sections is limited to 3.8 μm or less, the rubbing process of the orientation film formed on the color filter panel can surely be performed over the whole surface. In addition, if the height to the top of the second projecting sections exceeds 3.8 μm, there is a section around the second projecting sections where the rubbing process cannot be performed (since the component for performing the rubbing process is prevented by the second projecting sections from contacting the orientation film of the pixel opening sections), and hence liquid crystal molecules cannot be aligned in a predetermined direction around the second projecting sections.

In the liquid crystal display device of the present invention, since the height from the surface Of the pixel opening sections to the top of the first projecting sections is limited to 3.8 μm or less in the array panel, the rubbing process of the orientation film formed on the array panel can reliably be performed over the whole surface. In addition, if the height to the top of the first projecting sections exceeds 3.8 μm, there is a section around the first projecting sections where the rubbing process cannot be performed (since the component for performing the rubbing process is prevented by the first projecting sections from contacting with the pixel opening sections), and hence liquid crystal molecules cannot be aligned in a predetermined direction around the first projecting sections.

In the liquid crystal display device of the present invention, since a display electrode layer is provided between the top of the second projecting sections and the orientation film, the cell gap can be compensated by the thickness of the display electrode. Since the thickness of the display electrode is thin as compared with the color filters, black matrix, and the like, the cell gap can be finely adjusted.

In the method for manufacturing a liquid crystal display device according to the present invention, the height of the first projecting sections to be formed on an array panel and the height of the second projecting sections to be formed on a color filter panel are determined so that the sum of the heights of the first and second projecting sections corresponds to a cell gap.

Then, on an array panel having pixel opening sections disposed in a matrix arrangement and active elements disposed in the vicinity of the pixel opening sections, a plurality of first projecting sections is formed by a black matrix for blocking regions other than the pixel opening sections from light so that the first projecting sections are as high as determined, and on a color filter panel, color filters are formed in positions corresponding to the pixel opening sections and a plurality of second projecting sections are formed so that they are as high as determined. Subsequently, an orientation film is formed on the array panel on which the first projecting sections are formed and on the color filter panel on which the second projecting sections are formed, respectively. The array panel and the color filter panel, on which the orientation films are formed, are placed one upon the other and sealed in the peripheries thereof, and liquid crystal is injected between the array panel and the color filter panel after sealing the peripheries thereof, thereby completing a liquid crystal display device.

Finally, in the method of manufacturing a liquid crystal display device of the present invention, the second projecting sections are formed out of the color filter forming materials simultaneously with the color filters. Thus, there is no need for a special forming process for forming the second projecting sections, so that the number of processes for the color filter panel do not increase over the conventional method.

BRIEF DESCRIPTION OF THE DRAWINGS

FIGS. 5 (A) to (C) are plan views of the color filter panel showing the processes of placing the color filters one upon another; and FIGS. 6 (A) to (E) are other embodiments of the color filters.

DETAILED DESCRIPTION OF THE PREFERRED EMBODIMENT

The liquid crystal display device 10 related to an embodiment of the present invention is described according to FIGS. 1 to 5.

The liquid crystal display device 10 of this embodiment is an active matrix-driven liquid crystal display device.

Figure 1:
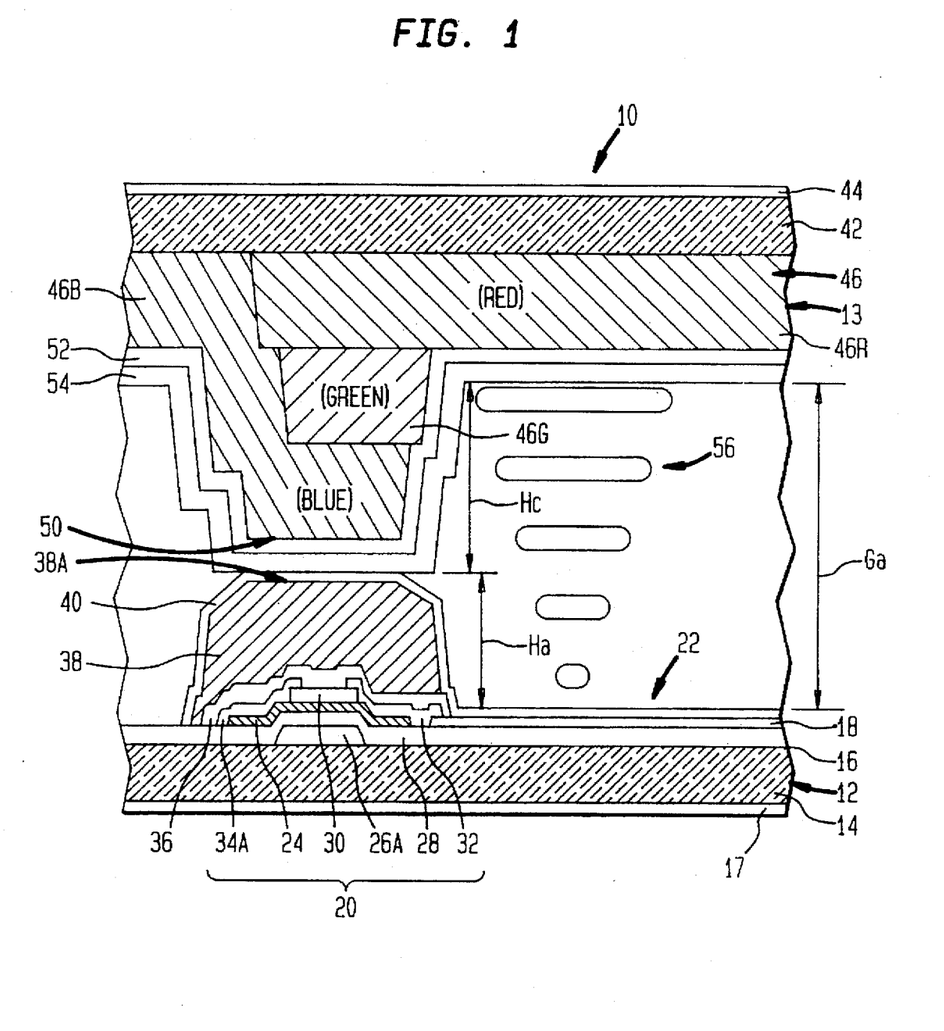
FIG. 1 is a cross-sectional view related to the liquid crystal display device related to an embodiment of the present invention.

The liquid crystal display device 10 has an array panel 12 and a color filter panel 13 as shown in FIG. 1.

An array panel 12 has a glass panel 14, and under coat layer 16 is formed on the top of the glass panel 14 and a deflection plate 17 is bonded to the underside thereof.

Figure 2:
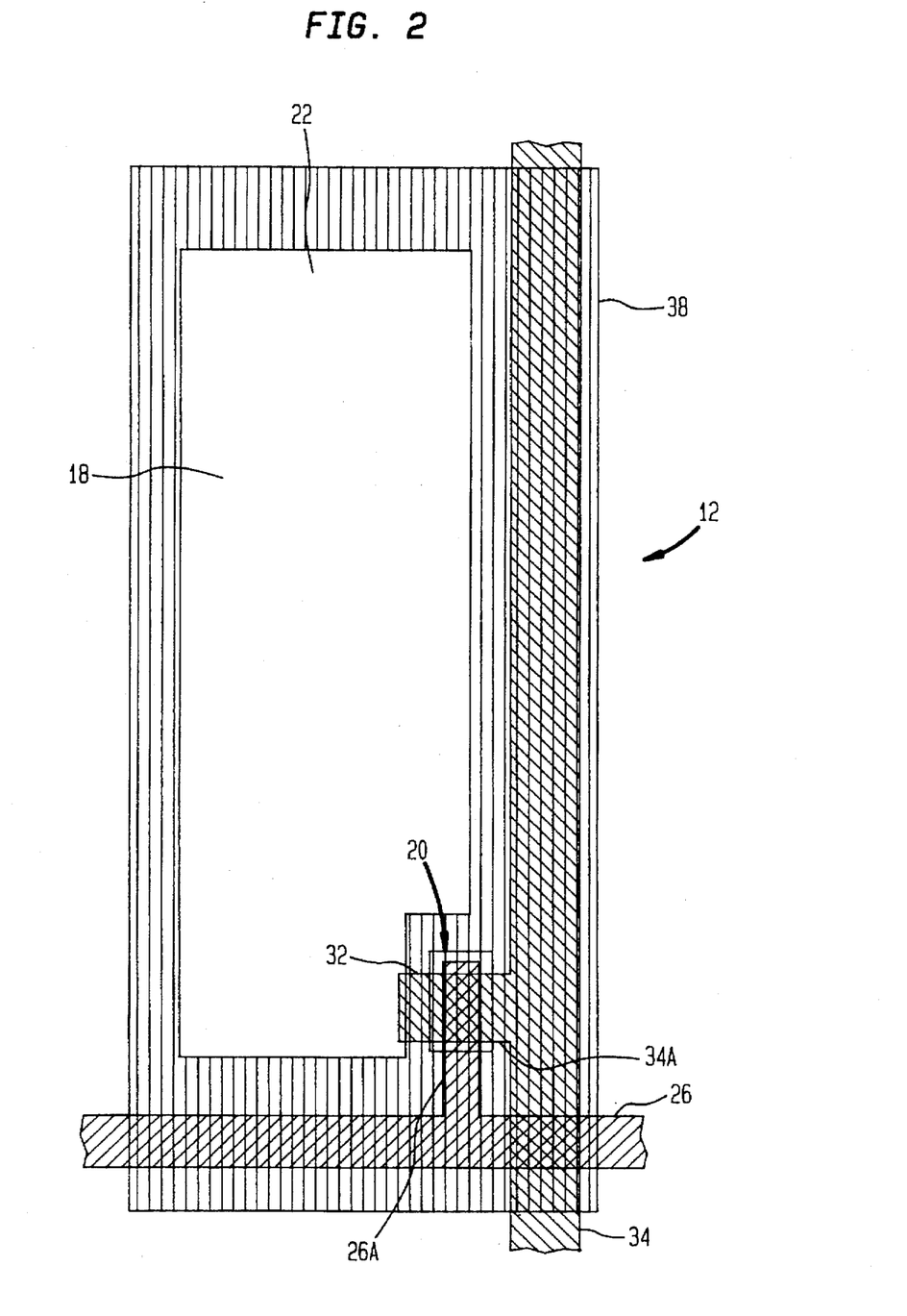
FIG. 2 is a plan view of the array panel.

In the surface of the undercoat layer 16, as shown in FIG. 2, data lines 34 extending longitudinally of FIG. 2 are formed laterally of FIG. 2 at predetermined intervals (only one data line is shown in FIG. 2), and gate lines 26 extending laterally of FIG. 2 are formed longitudinally of FIG. 2 at predetermined intervals (only one gate line is shown in FIG. 2).

In a rectangular region surrounded by data lines 34 and gate lines 26, a display electrode 18 is placed as a rectangular transparent display electrode layer, and a TFT 20 as an active element is placed in the vicinity of the intersection of the data line 34 and the gate line 26.

As shown in FIG. 1, the TFT 20 comprises a semiconductor layer (a layer in which a channel is formed) 24, a gate electrode 26A, a gate insulation film 28, an insulation film 30, a source electrode 32 and a drain electrode 34A.

As shown in FIG. 2, the gate electrode 26A is an extension of part of the gate line 26 (a region in which slanted lines are upward to the right), and the drain electrode 34A is an extension of part of the data line 34 (a region in which slanted lines are upward to the left). In addition, the source electrode 32 (a region in which slanted lines are upward to the left) is connected to the display electrode 18.

As shown in FIG. 1, the surface of the TFT 20 is covered with a protective film 36 on which a black matrix 38 is formed.

As shown in FIG. 2, the black matrix 38 (in FIG. 2, a vertically-striped region) covers the region except for the display electrode 18 (part of the TFT 20 (a dotted region), data line 34, gate line 26, and source electrode 32).

In addition, the region corresponding to the display electrode 18 (where the black matrix 38 is not formed) is a pixel opening section 22.

The black matrix 38 is formed by a selective etching process after a black photoresist is applied. The black photoresist of this embodiment is made by dispersing a blue pigment, a yellow pigment, and a purple pigment in a transparent photoresist in a predetermined proportion.

Since the black matrix 38 is formed to a substantially fixed thickness on the surface of a component, the black matrix 38 formed on the array panel 12 has an irregular surface. As shown in FIG. 1, since the TFT 20 has the largest height on the array panel 12 before the black matrix 38 is formed, a first projecting section 38A is formed on the TFT 20 when the black matrix 38 is formed. That is, the top of the first projecting section 38A is the highest position on the array panel 12.

On the one hand, an orientation film 40 is formed on the surface of the black matrix 38 and the display electrode 18. The surface of the orientation film 40 is subjected to a rubbing process by a well-known method, thereby aligning liquid crystal molecules in a predetermined direction when no voltage is applied.

On the other hand, the color filter panel 13 has a glass panel 42, and a deflection plate 44 is bonded to the top of the glass panel 42.

Figure 3:
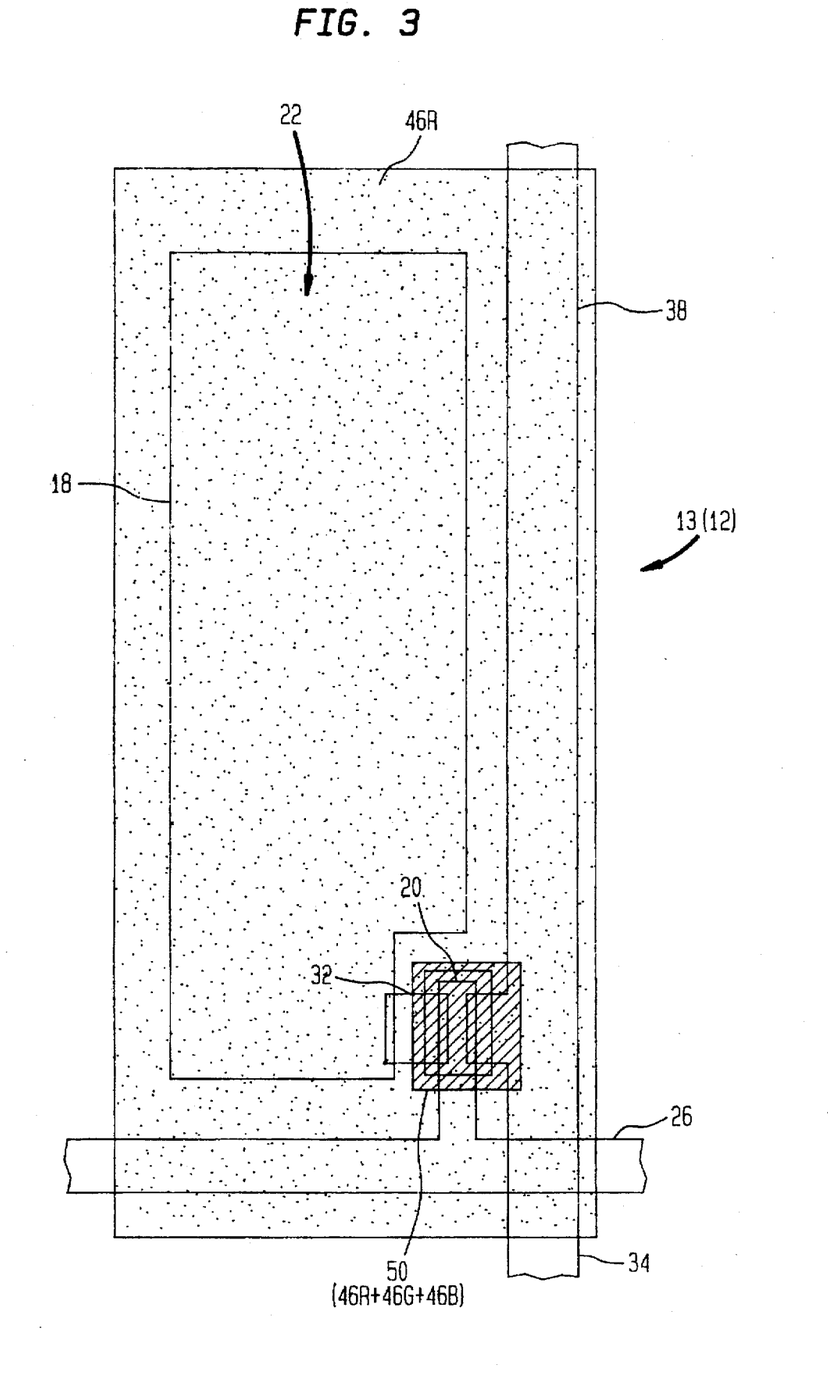
FIG. 3 is a plan view of the liquid crystal display device as seen from the color filter panel side.

A color filter 46 is formed on the underside of the glass panel 42. The color filter 46 includes a red color filter 46R, a green color filter 46G, and a blue color filter 46B, and one layer is formed in a position opposed to a predetermined pixel opening section 22, respectively (see FIG. 3, which is a figure when the liquid crystal display device 10 shown in FIG. 1 is viewed from the color filter panel 13 side, with the black matrix 38 omitted). In FIG. 3, one pixel opening section 22 is shown, and in FIG. 3, for instance, the red color filter 46R (dotted region) is formed.

As shown in FIGS. 1 and 3, on the color filter panel 13, in a position opposed to the first projecting section 38A on the array panel 12, a second projecting section 50 is formed in which the red color filter 46R, the green color filter 46G, and the blue color filter 46B are placed one upon another.

As shown in FIG. 1, a transparent common electrode 52 is formed on the whole surface of the color filter 46, and an orientation film 54 is formed on the surface of the common electrode 52.

The sizes of the various parts in the cross section of the liquid crystal display device 10 of this embodiment will be described next.

On the array panel 12, the height to the protection film 36 of the TFT 20 is about 1 μm when measured from the surface of the display electrode 18.

The cell gap Ga of liquid crystal display device 10 (see FIG. 1: the size from the surface of the orientation film 40 formed in the pixel opening section 22 on the array panel 12 to the surface of the orientation film 54 of the color filter panel 13 opposed to the pixel opening section 22) is the sum of the height Ha from the surface of the orientation film 40 formed on the surface of the display electrode 18 to the surface of the orientation film 40 formed on the top of the first projecting section 38A and the Hc from the surface of the orientation film 54 formed on the surface of the common electrode 52 of the color filter 13 to the surface of the orientation film 54 formed on the top of the second projecting section 50.

Appropriate cell gap Ga of the liquid crystal display device 10 is 4.5 to 7.1 µm when a TN liquid crystal is used which becomes white when no voltage is applied, because appropriate optical-path difference Δn·d of the liquid crystal layer is 0.45 to 0.5 and Δn of the TN liquid crystal is 0.07 to 0.10.

Although there are various combinations of height Ha and height Hc to make the cell gap Ga 4.5 to 7.1 µm, a section (around a projecting section) in which a rubbing process cannot be performed occurs in the orientation film 40 if height Ha exceeds 3.8 µm and in the orientation film 54 if the height Hc exceeds 3.8 µm, and it is thus required to form the black matrix 38 so that height Ha does not exceed 3.8 µm, and to set the thickness of the color filter 46 and the number of ladders to be placed one upon another so that height Hc does not exceed 3.8 µm. In addition, if height Ha or Hc exceeds 3.8 µm, a failure may occur when the orientation films 40 or 54 is formed (printed).

In this embodiment, height Ha is set to 3.0 µm and height Hc is set to 2.2 µm.

In addition, as the blocking effect of the TFT 20, it is considered that the optical density (OD) of the black matrix section is preferably maintained to be 3.5 or higher at a practical use level.

Figure 4:
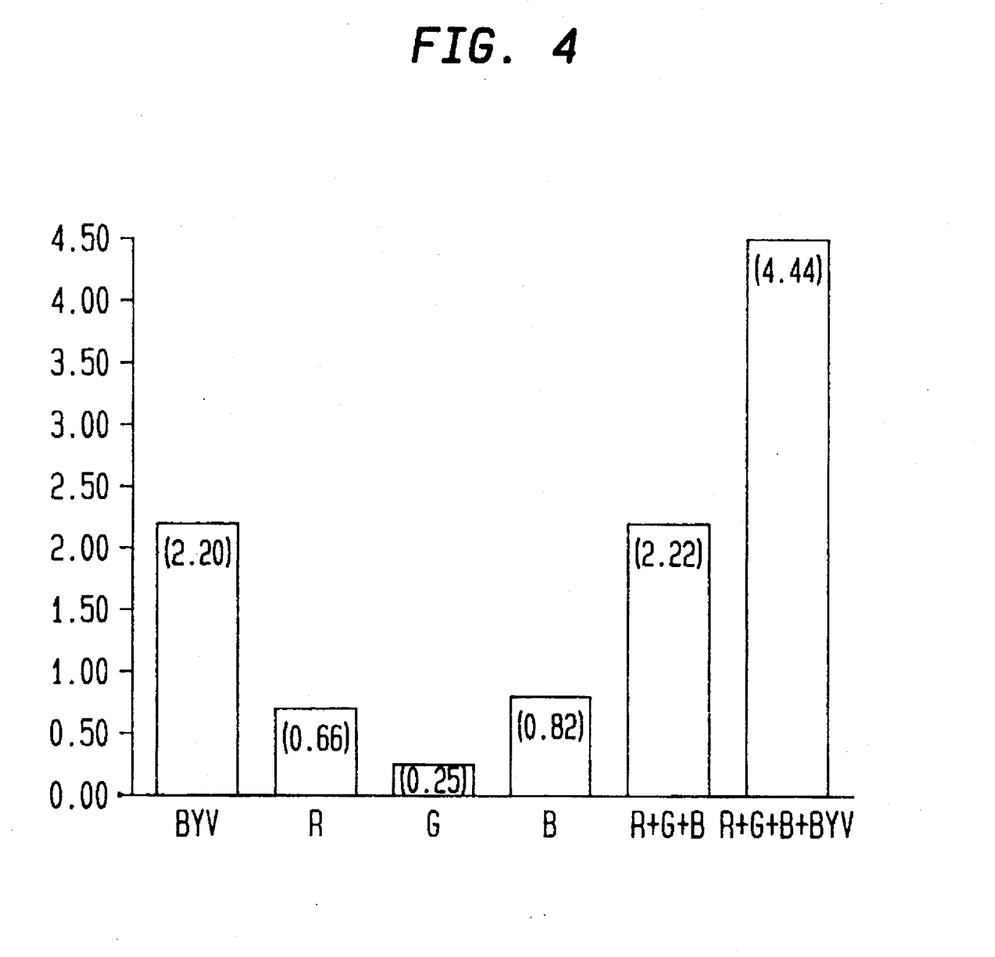
FIG. 4 is a graph of the optical densities of the color filters and the black matrix.

FIG. 4 shows the ODs for the red color filter 46R (film thickness: 1.1 µm), the green color filter 46G (film thickness: 1.1 µm), the blue color filter 46B (film thickness: 1.1 µm), and the black matrix 38 (film thickness: 2.0 µm), alone or placed one upon another.

In consequence, to obtain the blocking effect of the TFT 20 which is 3.5 or higher, since, in this embodiment, the OD of the multilayer part of the red color filter 46R, the green color filter 46G, and the blue color filter 46B is 2.22, the film thickness of the black matrix 38 on the TFT 20 must be 1.0 µm or larger.

To ensure the rubbing process and the block effect of the TFT 20, in the construction of this embodiment, the film thickness of each layer of the red color filter 46R, the green color filter 46G, and the blue color filter 46B is preferably 1.9 µm or less, and the film thickness of the black matrix 38 is 1.0 to 2.8 µm.

In this embodiment, since the optical density of the multilayer part on the TFT 20 is 4.44 which is the sum of the ODs of the red color filter 46R, the green color filter 46G, the blue color filter 46B, and the black matrix 38, the blocking of the TFT 20 is ensured.

The manufacture processes of the liquid crystal display device 10 of this embodiment will be described next.

First, the manufacturing processes for the array panel 12 are described.

In the first process, the undercoating layer 16 is formed on the glass panel 14.

In the second process, the gate electrode 26A and the gate lines 26 are formed on the undercoating layer 16.

In the third process, the gate insulation film 28 is formed.

In the fourth process, the semiconductor 24 of the TFT 20 is formed.

In the fifth process, the display electrode 18 is formed.

In the sixth process, the source electrode 32 and the drain electrode 34A of the TFT 20, and the data lines 34 are formed.

In the seventh process, the protective film 36 covering the TFT 20 is formed.

In the eighth process, the black matrix 38 is formed so as to expose the display electrode 18.

In the ninth process, the orientation film 40 is formed, and the rubbing process of the orientation film 40 is performed.

The manufacturing processes for the color filter panel 13 will be described next.

Figure 5A:
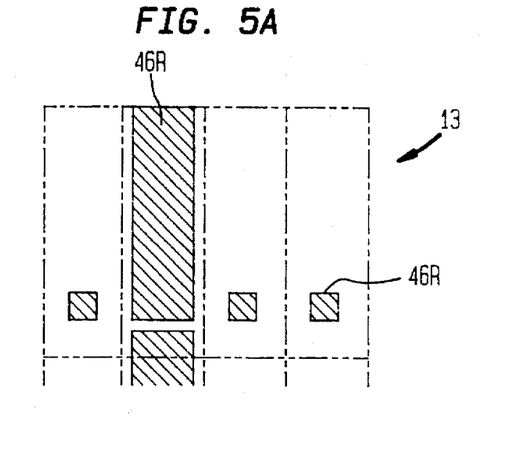

In the first process, on the glass panel 42 the red color filter 46R (a section in which there are lines slanted upward to the left) is formed in a position opposed to the black matrix 38 of the array panel 12 and a position opposed to a predetermined pixel region 22 (see FIG. 5 (A)).

Figure 5B:
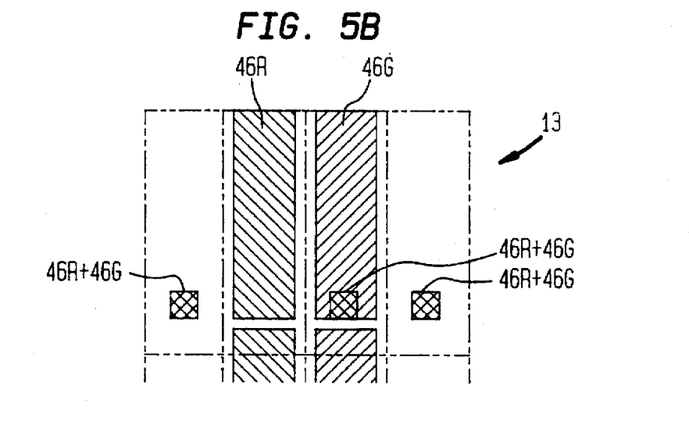

In the second process, the green color filter 46G (a section in which there are lines slanted upward to the right) is formed on the red color filter 46R formed in a position opposed to the black matrix 38 of the array panel 12 and in a position opposed to a predetermined pixel region 22 (see FIG. 5 (B)).

Figure 5C:
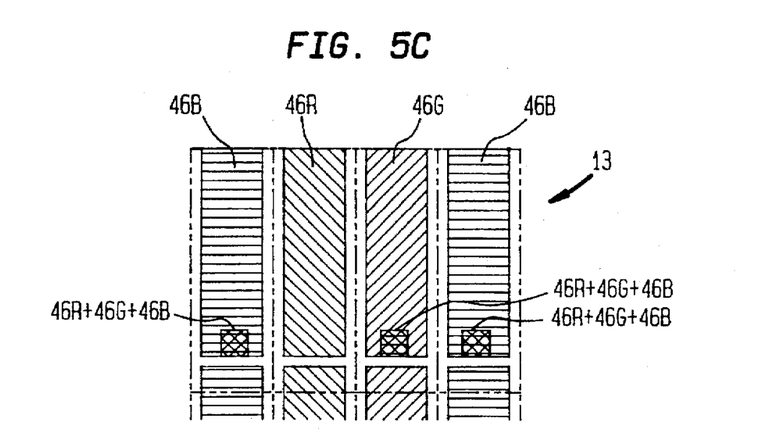
Figure 6A:
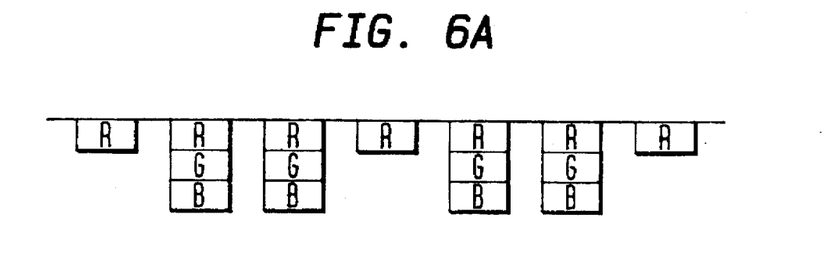
Figure 6B:
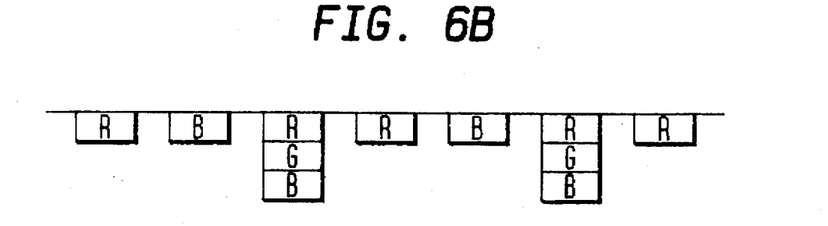
Figure 6C:
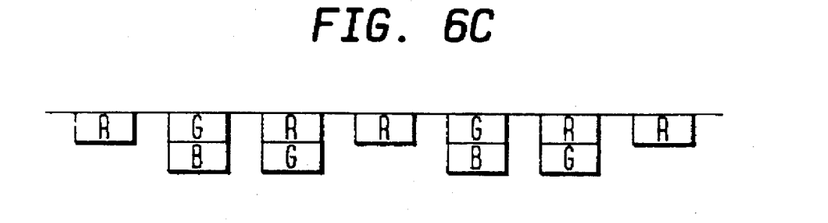
Figure 6D:
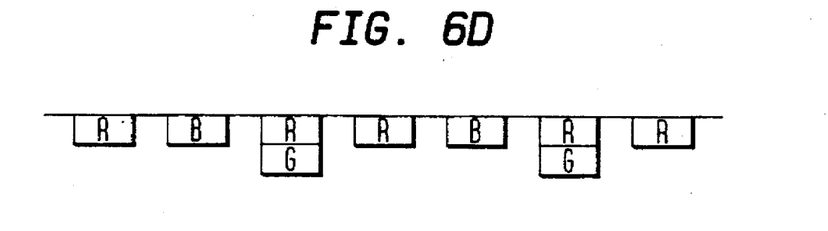
Figure 6E:
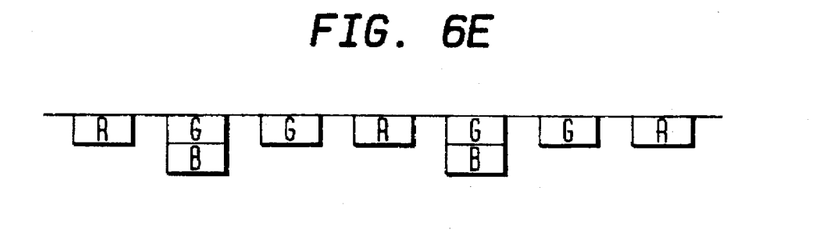

In the third process, the blue color filter 46B (laterally-striped section) is formed on the green color filter 46G formed in a position opposed to the black matrix 38 of the array panel 12 and in a position opposed to a predetermined pixel region 22 (see FIG. 5 (C)).

In the fourth process, the common electrode 52 is formed on the color filter 46.

In the fifth process, the orientation film 54 is formed on the common electrode 52, and the rubbing process of the orientation film 54 is performed.

The color filter panel 13 and the array panel 12 completed through the above described processes are made to oppose to each other, the peripheries of them are sealed by a resin, a TN liquid crystal 56 is injected into the inside from an injection hole (not shown), the injection hole is sealed, and the deflection plates 17 and 44 are bonded to the glass panels 14 and 42 on both sides, completing the liquid crystal display device 10.

The action of the liquid crystal display device 10 of this embodiment is described as follows:

In the conventional liquid crystal display device, since a spacer defining a cell gap is formed in either the array panel or the color filter panel, the height of the spacer corresponds to the cell gap and thus it becomes high (for instance, 5 µm or higher), which leads to a disadvantage in that the rubbing of the orientation film is not performed around the spacer, whereas in the liquid crystal display device 10 of this embodiment, since projection sections acting as a spacer defining a cell gap are provided on the array panel 12 and the color filter panel 13, respectively, the height of each projecting section can be kept half the height of the conventional spacer or less, and thus the rubbing process of the orientation films 40 and 54 can be reliably performed on the whole surface.

In this embodiment, since the second projecting sections 50 are formed by the color filter 46 and the first projecting sections 38A are formed by the black matrix 38, no special process for forming the spacer defining the cell gas is required.

Further, in the pixel region 22, there is no transparent spherical spacer which disturbs the molecular arrangement of liquid crystal to cause the leakage of light or leaks light by itself, the problem such as reduction in the black level or a reduction in the contrast does not occur.

In addition, in the conventional liquid crystal display device in which the black matrix is provided on the color filter panel, in consideration of possible errors in the array panel and the color filter panel (errors in the assembly, errors due to deflection after sealing, and so on), the black matrix is formed so that the edge of the black matrix is positioned inside of the pixel opening section of the array panel by a predetermined size. If the opening of the black matrix and the pixel opening section of the array panel are of the same size, the electrode of the array panel and the like are exposed if a positional error occurs in the array panel and the color filter panel, considerably degrading the display quality.

However, on the one hand, the black matrix is formed in such a way, that the opening area through which light is transmitted will decrease, and hence it is difficult to obtain a light image. On the other hand, in the liquid crystal display device 10 of this embodiment, since the black matrix 38 is formed on the array panel 12, no leakage of light will occur even if a positional error occurs. In addition, since the black matrix 38 can be formed by photolithography, errors in the relative positions between the TFT 20 and other components can be extremely reduced in number, the opening area of the black matrix need not be made small as when the black matrix is formed on the color filter panel. Consequently, the liquid crystal display device 10 of this embodiment can display a light image.

Furthermore, since the second projecting sections 50 are formed by the color filter 46 and the first projecting sections 38A are formed by the black matrix 38, and cell gap Ga can be defined by the second projecting sections 50 and the first projecting sections 38A, an extra process for forming a spacer of resin and the like defining cell gap Ga and the cumbersome process for dispersing transparent spherical spacers can be eliminated, whereby the number of processes can be reduced when compared to the conventional method.

Although the second projecting sections 50 are a three-layer structure of red, green, and blue in the above described embodiment, they may be a two-layer structure of any two of red, green, and blue. Further, the order of placing the red, green, and blue colors is not limited to the embodiment, but it may be changed as needed. In addition, the second projecting sections 50 need not be provided so as to correspond to all of the first projecting sections 38A, but they may be thinned out at predetermined intervals.

The height (the number of steps to be superimposed and the thickness of each layer) of the second projecting sections 50 and the arrangement position of the second projecting sections 50 may be appropriately changed depending on the conditions for the assembly of the array panel 12 and the color filter panel 13 (for instance, the injection condition and the pressurization condition of the TN liquid crystal 56 and the various characteristics of the liquid crystal display device 10 itself).

Other embodiments for placing the red color filter 46R, the green color filter 46G, and the blue color filter 46B one upon another are shown in FIGS. 6 (A) to (E) (in the figure, R represents red, G green, and B blue). In addition, it is to be noted that the order of placing colors, the colors of the adjacent pixel regions, and the like may differ from them.

Further, the respective thickness of the red color filter 46R, the green color filter 46G, and the blue color filter 46B may all be same or different.

Although TFTs are used as the active elements in the above described embodiment, other types of active elements, such as metal-insulator-metal (MIM) switches, varistors, diodes, and the like can, of course, be used.

In addition, although a TN liquid crystal is used as the liquid crystal in the above described embodiment, other types of liquid crystals may, of course, be used.

In the liquid crystal display device of the present invention, the above construction insures that the rubbing process of the orientation film of the array panel and the orientation film of the color filter panel can be performed over the whole surface, whereby the leakage of light can be prevented, which leads to the prevention in the reduction of the black level and the contrast.

In the liquid crystal display device of the present invention, since the second projecting sections are formed out of the color filter forming materials, the second projecting sections can be formed simultaneously with the formation of the color filters, and thus the number of processes for forming the color filter panel is not increased as compared to the prior art and the types of components used are not increased.

In the liquid crystal display device of the present invention, since the second projecting sections are of a multilayer structure of any two colors of the color filter forming materials of three colors, red, green, and blue, they can be made higher than the color filter section by a thickness at least for one color. In addition, the second projecting sections can be formed out of the color film forming materials simultaneously with the color filters, without increasing the number of processes for forming the color filter panel.

In the liquid crystal display device of the present invention, since the second projecting sections are of a multilayer structure of the color forming materials of three colors, red, green, and blue, they can be formed higher than the color filter section of the pixel opening sections by a thickness at least for two colors. In addition, the second projecting sections can be formed out of the color filter forming materials simultaneously with the color filters, without increasing the number of processes for forming the color filter panel.

In the liquid crystal display device of the present invention, since the first projecting sections are formed on the active elements, the malfunction of the active elements due to external light can be prevented. In particular, blocking is most effective if the second projecting sections are of a multilayer structure of the color filter forming materials of three colors, red, green, and blue.

In the liquid crystal display device of the present invention, since orientation films are disposed between the first and second projecting sections, the cell gap can be compensated for by the thickness of the orientation films, whereby the cell gap can be finely adjusted.

In the liquid crystal display device of the present invention, since the height from the surface of the color filters formed so as to correspond to the pixel opening sections to the top of the second projecting sections is limited to 3.8 µm or less, the rubbing process of the orientation film can fully be performed over the whole surface of the color filter panel. In this way, the alignment failure for liquid crystal molecules can be prevented.

In the liquid crystal display device of the present invention, the height from the surface of the pixel opening sections to the top or the first projecting sections is limited to 3.8 μm or less in the array panel, the rubbing process of the orientation film can fully be performed over the whole surface of the array panel. In this way, the alignment failure of liquid crystal molecules can be prevented.

In the liquid crystal display device of the present invention, since a display electrode is provided between the top of the second projecting sections and the orientation film, the cell gap can be compensated for by the thickness of the display electrode whereby the cell gap can be finely adjusted.

In the method for manufacturing the liquid crystal display device of the present invention, a liquid crystal display device which has no leakage of light, no reduction in the black level, and excellent contrast.

We claim:

1. A liquid crystal display device comprising:

an array panel upon which pixel opening sections and corresponding active elements are formed in a matrix arrangement;

a black matrix formed outside the pixel opening sections in order to block regions other than said pixel opening sections from view, wherein portions of said black matrix form a plurality of first spaced projecting sections;

a first orientation film covering the side of said array panel on which said black matrix is formed;

a color filter panel disposed opposite said array panel, upon which color filters of different colors are formed so as to correspond to said pixel opening sections;

second orientation film covering the side of said color filter panel on which said color filters are formed;

portions of said color filters forming a plurality of second spaced projecting sections aligned with said first spaced projecting sections, said aligned first and second spaced projecting sections abutting against one another so that said first and second spaced projecting sections together form spacers to maintain constant gaps in the pixel opening sections; and liquid crystal in said gaps between the orientation films of said array panel and said color filter panel.

2. A liquid crystal display device as set forth in claim 1 wherein said second projecting sections have a multilayer structure of any two colors of the color filter forming materials of the three colors, red, green, and blue while color filters in the pixel opening sections have a color filter forming material for only one of said three colors.

3. A liquid crystal display device as set forth in claim 1 wherein said second projecting sections have a multilayer structure of the color filter forming materials of three colors, red, green, and blue while color filters in the pixel opening sections have a color filter forming material for only one of said three colors.

4. A liquid crystal display device as set forth in claim 3 wherein said first projecting sections include said active elements as part of their structure.

5. A liquid crystal display device as set forth in claim 4 wherein said first and second projecting sections are approximately the same height.

6. A liquid crystal display device as set forth in claim 1 wherein said first and second projecting sections are positioned opposed to each other through both orientation films.

7. A liquid crystal display device as set forth in claim 6 wherein a display electrode layer is provided between the top of said second projecting sections and said orientation film.

8. A liquid crystal display device as set forth in claim 1 wherein the height from the surface of the color filters formed so as to correspond to said pixel opening sections in said color filter panel to the top of said second projecting sections is limited to 3.8 μm or less.

9. A liquid crystal display device as set forth in claim 1 wherein said first and second projecting sections are approximately the same height.

10. A liquid crystal display device as set forth in claim 9 wherein, in said array panel, the height from the surface of said pixel opening sections to the top of said first projecting sections is limited to 3.8 μm or less.

11. A method for manufacturing a liquid crystal display device comprising:

determining the height of first projecting sections to be formed on an array panel and the height of second projecting sections to be formed on a color filter panel so that sum of the heights of said first and second projecting sections corresponds to a cell gap;

on said array panel, forming active elements;

forming a black matrix above the active elements so that said black matrix defines pixel opening sections that are open to light and regions other than said pixel opening sections that are blocked from light, and wherein said black matrix and said active elements form a plurality of first projecting sections;

on said color filter panel, forming color filters in positions corresponding to said pixel opening sections, and forming a plurality of second projecting sections of greater thickness than said color filter in areas facing said first projecting sections over said active elements;

forming a first orientation film on said array panel and a second orientation film on said color filter panel;

placing said array panel on said color filter panel so that said first and second projecting sections abut against one another to form spacers that maintain pixel opening spacing, and sealing the peripheries of said panels; and injecting liquid crystal between said array panel and said color filter panel.

12. A method for manufacturing a liquid crystal display device as set forth in claim 11 wherein said second projecting sections are formed as a portion of said color filters.

* * * * *